United States Patent [19]

Sahf

[11] Patent Number: 5,405,024
[45] Date of Patent: Apr. 11, 1995

[54] PEN HOLDER

[76] Inventor: Patrick M. Sahf, 201 S. Pearl, Trenton, Tex. 75490

[21] Appl. No.: 145,576

[22] Filed: Nov. 4, 1993

[51] Int. Cl.⁶ .............................................. A47F 7/00
[52] U.S. Cl. ............................ 211/69.5; 248/205.3; D19/85
[58] Field of Search ............ 211/69.1, 69.5, 60.1, 211/87; 248/205.3, 314, 221.4; D19/85, 84, 81

[56] References Cited

U.S. PATENT DOCUMENTS

| | | | |
|---|---|---|---|
| Re. 28,289 | 12/1974 | Calkins | 248/205.3 X |
| D. 265,324 | 7/1982 | Hedgeman | D19/85 |
| D. 305,777 | 1/1990 | Lee | D19/85 |
| 1,831,712 | 11/1931 | Keenan | 211/69.5 |
| 2,959,296 | 11/1960 | Case | 211/69.1 |
| 3,800,974 | 4/1974 | Mogel et al. | 211/69.1 X |
| 4,121,719 | 10/1978 | Wilhelm | D19/85 X |
| 5,203,451 | 4/1993 | Short | 211/69.1 X |
| 5,232,103 | 8/1993 | Koehig et al. | 211/60.1 X |

*Primary Examiner*—Robert W. Gibson, Jr.
*Attorney, Agent, or Firm*—John E. Vandigriff

[57] ABSTRACT

Disclosed is a pen holder device having two pen holders, one mounted vertically above the other. In each pen holder is a reduced enclosed end for receiving a pen tip, and a seal adjacent the enclosed end to prevent air circulation around the pen tip when the pen in the holder.

15 Claims, 3 Drawing Sheets

PEN HOLDER

FIELD OF THE INVENTION

This invention relates to writing pens, and more particularly, to a novel pen holder that may be adjustably attached to the side of a computer keyboard or other object having a vertical side.

BACKGROUND OF THE INVENTION

Most desk type pen holders are free standing and have a vertical or slightly inclined opening into which the point of the pen is inserted to hold the pen. Most of the openings are simple holes that permit air to enter and dry the ink on the point of the pin.

Pen holders have been made that are secured to a vertical surface, with the body of the pen being wedged shaped and held in a wedged shape opening on the holder. This type of mounting permits air to dry the tip of the pin.

In U.S. Pat. No. 5,033,629, a pin holder is described with the additional feature that the holder is for a felt tip pen and the pin is inserted though an opening that has a doughnut shaped insert at the mouth of the opening to seal against the pen at the mouth of the opening, and to seal the inside of the holder while not permitting direct contact with air outside of the holder. Since the seal is at the mouth of the opening, the entire volume of the holder does retain air that tends to dry the felt tip of the pen.

SUMMARY OF THE INVENTION

The invention is to a dual pen holder that is adjustably mountable to a vertical surface, for example the side of a computer key board. The holder has two inclined tubular holders that have a reduced volume area at the bottom of the inside of the holders to received the tips of pens, such as ball point, fiber tip and felt tip. At an interface between the pen holder and the tip holding volumes is a seal ring that seals the inked tip in the reduced volume part of the holder. The reduced volume of the tip holding area, and the seal adjacent to the inked tip of the pen minimizes the amount of air sealed with the inked tip while the pen is in the holder.

The two pen holders are formed, one over the other in a vertical plane with a flat area between the two holders. The flat area between the holders has a row of holes that are used for attaching a mounting bracket, that has an adhesive surface, to a vertical mounting area. The mounting bracket is removably attached to the pen holder in the row of holes. The mounting bracket has two flexible clip lock pins that are inserted into a hole in the holder. By inserting the clip lock pins in different holes in the pen holder, the pen holder position may be changed.

The technical advance represented by the invention, as well as the objects, thereof will become apparent from the following description of a preferred embodiment of the invention when considered in conjunction with the accompanying drawings, and the novel features set forth in the appended claims.

DESCRIPTION OF A PREFERRED EMBODIMENT

Figure 1:
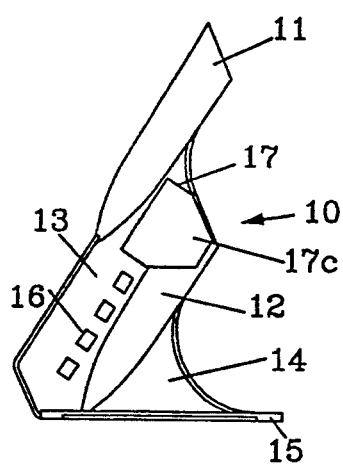
FIG. 1 is a side view of the present invention.

FIG. 1 is a side view of the pen holder of the present invention. Pen holder 10 has two tubular pen holders 11 and 12 joined together by frame or web 13. Pen holder 12 is mounted on base 15 and attached to base 15 by support 14. Support frame 13, between pen holders 11 and 12 has a plurality of holes 16 which are used to attach the pen holder to a mounting bracket 17. Mounting surface 17a of bracket 17 has an adhesive thereon for mounting pen holder 10 to a vertical mounting surface. Mounting bracket 17 has a pair of clip lock pins (FIG. 7) which are inserted in a hole 16 to secure pen holder 10 to mounting bracket 17. Mounting bracket 17 may utilize any one of the adjacent holes 16 to vary vertically the position of pen holder on the surface on which it is mounted by bracket 17.

Figure 2:
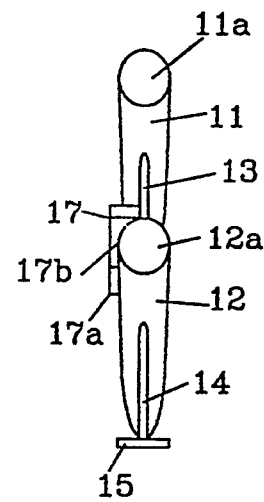
FIG. 2 is a right side view of the present invention.

FIG. 2 is a right end view of pen holder 10. Shown is pen holder openings 11a and 12a, into which pens may be inserted. Mounting bracket 17 is shown with a lower part 17a, having a side 17b adjacent to holder 12 that is curved to fit around the curved wall of holder 12. As mounting bracket 17 is moved downward to clip into other mounting holes 16, curved side 17b sides down the curved outer surface of holder 12.

Figure 3:
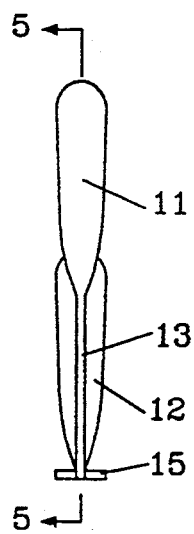
FIG. 3 is a left side view of the present invention.

FIG. 3 is a left end view of pen holder 10 showing the basic structure of the pen holder 10.

Figure 4:
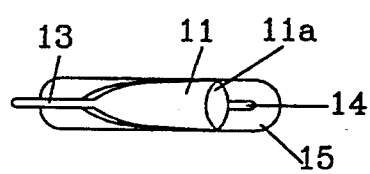
FIG. 4 is a top view of the present invention.

FIG. 4 is a top view of pen holder 10. Since pen holder 11, the top pen holder, extends upward and to the right of holder 12 (as viewed in FIG. 1), only opening 11a of pen holder 11 is visible.

Figure 5:
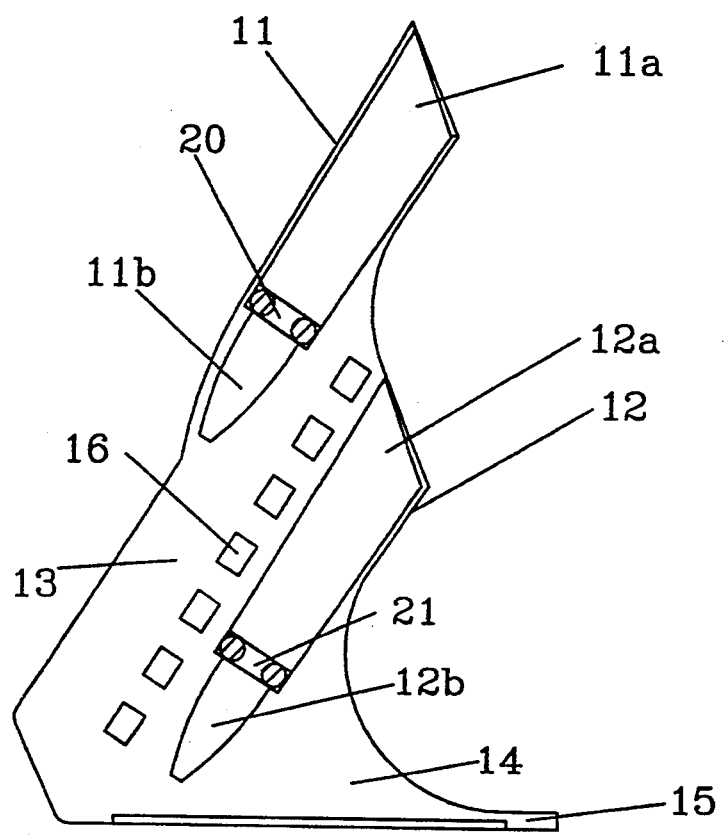
FIG. 5 is a cross-sectional view taken through section 5-5 of FIG. 3.

FIG. 5 is a cross-sectional view of pen holder 10 taken through section 5—5 of FIG. 3. The base 15 is attached to the support frame made up of parts 13 and 14 which forms a flat web structure between the two pen holders 11 and 12. Pen holders 11 and 12 are tubular in form. Pen holder 11 internal area 11a tapers to a reduced section 11b, and pen holder 12 internal area 12a tapers to a reduced section 12b. Reduced sections 11b and 12b have a reduced volume, and the volume is large enough to hold the tip of the pen.

Between pen holder 11 internal areas 11a and 11b is a groove 20 into which a seal is placed to seal off reduced section 11b when a pen is in holder 11. The outer surface of a pen in holder 11 will seal against seal 20 to prevent air circulation into section 11b when a pen is in holder 11.

Holder 12 has a similar seal 21 between internal sections 12 and 12b to prevent air circulation around the tip of a pen when the pen is placed in pen holder 12.

The support structure or web 13 between pen holders 11 and 12 has holes 16 used for attaching a mounting bracket to pen holder 10. Holes 16 extend completely through web 13.

Figure 6:
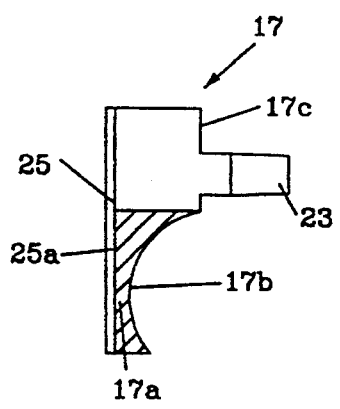
FIG. 6 is an end view of the mounting clip.
Figure 7:
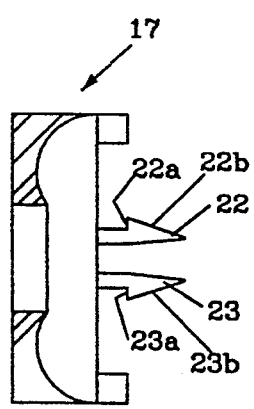
FIG. 7 is a top view of the mounting clip.
Figure 8:
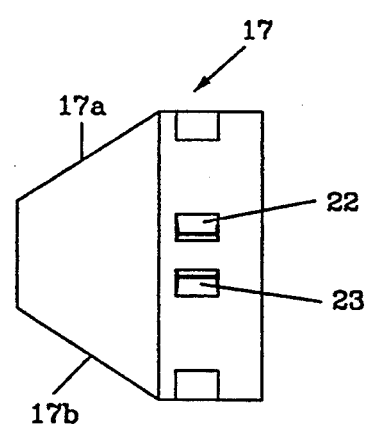
FIG. 8 is a back view of the mounting clip.

FIGS. 6, 7 and 8 illustrate a mounting bracket 17 which is used to mount pen holder 10, and to secure it to a vertical mounting surface, such as the vertical side of a computer keyboard, video monitor or the computer housing. Bracket 17 has a flat mounting surface 25 that has an adhesive 25 thereon. This adhesive is used to secure the mounting bracket to a vertical surface. Bracket 17 a pair of flexible clip lock pins 22 and 23 that are inserted one of holes 16. Pin 22 has a lock shoulder 22a and pin 23 has a lock shoulder 23a. When pins 22 and 23 are inserted into one of holes 16, the pins pass through the hole, are flexed toward each other by tapered sections 22b and 23b until lock shoulders clear the hole 16 and then lock pins 22 and 23 in hole 16. To removed pin holder 10 from mounting bracket 17, pins 22 and 23 ares squeezed together and pushed out of hole 16.

Bracket 17 has a rounded area 17b that conforms with the contour of the outside surface of pen holder 12, and a flat area 17c that is in contact with web 13 around holes 16. Mounting bracket 17 may be mounted to pen holder 10 by inserting pins 22 and 23 into any one of adjacent holes 16. This permits varying the vertical position of pen holder 10 after bracket 17 has been adhered to a vertical surface.

Base 15 may also have an adhesive on its bottom side so that the pen holder may be mounted on a flat surface.

What is claimed:

1. A pen holder device, comprising:
   a first pen holder;
   a second pen holder;
   a flat surface connecting the first and second pen holders;
   a plurality of holes in the flat surface;
   a mounting bracket secured in one of said plurality of holes for securing said first and second pen holders to a vertical surface; and
   a seal ring in each of said first and second pen holders for sealing around a pen body.

2. The pen holder device according to claim 1, wherein said mounting bracket is removably secured in one of said plurality of holes.

3. The pen holder device according to claim 1, wherein said mounting bracket has a flat surface with an adhesive thereon for mounting said pen holder.

4. The pen holder device according to claim 1, wherein each of said first and second pen holders includes an elongated receptacle with an opening in one end for receiving a pen and a closed end for receiving the pen tip, said seal ring adjacent the closed end of the elongated receptacle.

5. The pen holder device according to claim 1, wherein said first and second pen holders are mounted vertically, one above the other.

6. The pen holder device according to claim 5, wherein the vertically mounted pen holders are inclined from a horizontal plane.

7. The pen holder device according to claim 1 wherein said mounting bracket has a flat surface and a curved surface, said flat surface contacting the flat surface between said first and second pen holders, and said curved surface extending partially around a surface of said second pen holder.

8. The pen holder device according to claim 1, wherein said first and second pen holders are generally tubular in shape having an opening in one end for receiving a pen, and is tapered to an enclosed end.

9. A pen holder device for mounting on a vertical surface, comprising:
   a first pen holder having an elongated tubular volume within the holder for receiving a pen, the tubular volume having an open end and a closed end;
   a second pen holder having an elongated tubular volume within the holder for receiving a pen, the tubular volume having an open end and a closed end;
   a flat surface connecting the first and second pen holders;
   a plurality of holes in the flat surface;
   a mounting bracket removably secured in one of said plurality of holes for securing said first and second pen holders to a vertical surface; and
   a seal ring in the tubular volume of each pen holder adjacent to the closed end restricting air flow from around a pen tip when a pen is in the holder.

10. The pen holder device according to claim 9, wherein said mounting bracket is removably secured in one of said plurality of holes.

11. The pen holder device according to claim 9, wherein said mounting bracket has a flat surface with an adhesive thereon for mounting said pen holder.

12. The pen holder device according to claim 9, wherein each of said first and second pen holders includes an elongated receptacle with an opening in one end for receiving a pen and a closed end for receiving the pen tip.

13. The pen holder device according to claim 9, wherein said first and second pen holders are mounted vertically, one above the other.

14. The pen holder device according to claim 13, wherein the vertically mounted pen holders are inclined from a horizontal plane.

15. The pen holder device according to claim 9, wherein said mounting bracket has a flat surface and a curved surface, said flat surface contacting the flat surface between said first and second pen holders, and said curved surface extending partially around a surface of said second pen holder.

* * * * *